United States Patent [19]
Ishiharada et al.

[11] Patent Number: 5,333,227
[45] Date of Patent: Jul. 26, 1994

[54] OPTICAL WAVEGUIDE HOSE

[75] Inventors: Minoru Ishiharada; Rikuhei Itou, both of Kodaira; Itsuo Tanuma, Sayama; Kazuo Naito, Kawasaki; Yasuhiko Matsumuro, Bunkyo; Takao Aoki, Yokohama; Kiyoshi Koyama, Kamakura, all of Japan

[73] Assignee: Bridgestone Corporation, Tokyo, Japan

[21] Appl. No.: 43,839

[22] Filed: Apr. 7, 1993

[30] Foreign Application Priority Data

| Apr. 7, 1992 | [JP] | Japan | 4-114071 |
| May 1, 1992 | [JP] | Japan | 4-140128 |
| May 14, 1992 | [JP] | Japan | 4-148268 |
| Aug. 25, 1992 | [JP] | Japan | 4-248592 |

[51] Int. Cl.$^5$ .................................. G02B 6/36
[52] U.S. Cl. ........................ 385/100; 385/900
[58] Field of Search ............ 385/100, 125, 129, 900

[56] References Cited

U.S. PATENT DOCUMENTS

| 3,814,497 | 6/1974 | Stone | 385/100 |
| 3,995,934 | 12/1976 | Nath | 385/100 X |
| 4,375,314 | 3/1983 | Sakuragi et al. | 385/125 |
| 4,806,289 | 2/1989 | Laursen et al | 385/125 X |
| 5,090,793 | 2/1992 | Seike et al. | 385/100 |
| 5,095,199 | 3/1992 | Selby et al. | 250/206.2 |

FOREIGN PATENT DOCUMENTS

| 3634651 | 4/1988 | Fed. Rep. of Germany . |
| 64-80910 | 3/1989 | Japan . |
| 64-80912 | 3/1989 | Japan . |
| 1450608 | 9/1976 | United Kingdom . |

*Primary Examiner*—Akm E. Ullah
*Attorney, Agent, or Firm*—Sughrue, Mion, Zinn, Macpeak & Seas

[57] ABSTRACT

An optical waveguide hose includes a hollow tubular cladding, a fluid core in the cladding, the fluid having a higher index of refraction than the cladding, and sealing plugs mated with opposite end openings of the cladding. In one form, the core fluid is filled in the cladding under positive pressure. In another form, a sheath of a gas barrier material encloses the outer periphery of the cladding. The pressurized fluid core or the gas barrier sheath prevents air from penetrating into the core, allowing the hose to maintain its light transmission function.

12 Claims, 11 Drawing Sheets

OPTICAL WAVEGUIDE HOSE

BACKGROUND OF THE INVENTION

1. Field of the Invention

This invention generally relates to an optical waveguide hose having a fluid core, and more particularly, to an optical waveguide hose having a fluid core which can prevent penetration of gas into the core, has flexibility and maintains its function over a long period of time. The present invention also relates to various applications of the optical waveguide hose.

2. Prior Art

Prior art well-known fiber optics include optical fibers of inorganic glass systems such as quartz glass and multi-component glass and optical fibers of plastic systems such as polymethyl methacrylate and polystyrene. These are all solid optical fibers wherein both the core and the cladding are solid materials. Although these optical fibers have satisfactory characteristics, they are limited in flexibility because they are formed from glass or hard plastics. Also, when it is desired to increase the diameter for transmitting a large quantity of light, a plurality of optical fibers each having a diameter of about 10 to 1,000 μm must be bundled. The optical fiber bundle has space left among fibers even when fibers are packed at a possible maximum packing density and thus has a reduced effective inlet surface area for receiving light. The bundle is then less efficient and rather expensive.

As one solution to the all solid optical fibers, the inventors proposed an optical waveguide hose using a normally liquid light transmitting medium. This is disclosed in Japanese Patent Application Kokai (JP-A) Nos. 80910/1989 and 80912/1989. The liquid system optical fiber includes a cladding in the form of a flexible hollow tube and a liquid core therein having a higher index of refraction than the cladding. Opposite end openings of the cladding are closed with window members. This allows the fiber to have a large diameter and a large effective light-receiving area and the fiber is thus highly efficient and cost effective.

Although the liquid system optical fiber had excellent features as mentioned above, it was less flexible in that the cladding was likely to kink when the fiber was subject to bending forces because the hollow tubular cladding was responsible for stiffness. The likelihood of kinking required careful handling during transportation and installation.

In addition, the liquid system optical fiber had a problem that due to a change in the service environment temperature, gases can penetrate into the core liquid to lower its transparency. This is because the core is liquid and thus has a higher coefficient of expansion than the hollow tubular cladding generally formed of resinous material. At low temperatures, the volume of the core liquid is smaller than the interior volume of the cladding so that the hollow interior of the cladding is under negative pressure to allow gases to penetrate thereto through the cladding wall. As a result, bubbles generate in the core liquid.

UK Patent No. 1,450,608, for example, proposed a liquid system optical fiber which had solved the gas penetration problem. This optical fiber is provided with a core liquid reservoir connected to the hollow tubular cladding. The reservoir makes up the core liquid when the core liquid decreases its volume at low temperatures, preventing the hollow interior of the cladding from becoming negative in pressure and thus preventing gas penetration into the core liquid.

This optical fiber, however, was required to form an aperture in the cladding for liquid communication before the reservoir could be connected to the hollow tubular cladding. This aperture caused light scattering and detracted from transparency. The attachment of the reservoir added to the weight and cost.

SUMMARY OF THE INVENTION

An object of the present invention is to provide a novel and improved liquid core optical waveguide hose which is improved in flexibility and handling, which prevents gas penetration into the core liquid and thus maintains transparency at a wide range of temperature over a long period of time, and which is lightweight and inexpensive. Another object of the present invention is to define applications of the optical waveguide hose including a vehicle lighting system and an indirect illuminating apparatus.

In connection with an optical waveguide hose wherein a hollow tubular cladding is filled with a core fluid having a higher index of refraction than the cladding and opposite end openings of the cladding are closed with sealing plugs, the inventors have found that if the pressure of the core fluid is increased, then even when the hose is used at low temperatures, it never happens that the hollow interior of the cladding reaches a negative pressure and gases penetrate through the cladding wall to develop bubbles in the core fluid. Then the hose remains transparent over a wide range of temperature. The increased pressure of the core fluid is also effective for preventing kinks, which leads to improved flexibility and ease of handling. This also eliminates a loss of transparency by light scattering at kinks. Since the prevention of the cladding hollow interior from negative pressure is accomplished only by increasing the pressure of the core fluid, the optical fiber can be manufactured at low cost without any increase in weight.

Regarding the same type of optical waveguide hose, the inventors have also found that if the outer periphery of the cladding is covered with a sheath of a gas barrier material, then even when the hose is used at low temperature at which the core fluid can decrease its volume or internal pressure to maintain the cladding hollow interior at negative pressure, the sheath is effective for preventing gases from penetrating through the cladding wall to develop bubbles in the core fluid. Then the hose remains transparent over a wide range of temperature. Since the prevention of the cladding hollow interior from negative pressure is accomplished by covering the cladding with a gas barrier material, the optical fiber can be manufactured at low cost without any increase in weight.

The above-described optical waveguide hoses have various applications including an illuminating apparatus for a vehicle and an indirect illuminating apparatus for providing indirect illumination to an interior and/or exterior of transportation means.

Accordingly the present invention provides an optical waveguide hose comprising a hollow tubular cladding having opposite end openings, a fluid core filled in the cladding, the fluid having a higher index of refraction than the cladding, and sealing plugs mated with the end openings of the cladding. In a first example, the fluid core is filled in the cladding under positive pressure. In a second example, a sheath of a gas barrier material encloses the outer periphery of the cladding. In a third example, the fluid core is filled in the cladding under positive pressure and a sheath of a gas barrier material encloses the outer periphery of the cladding.

The present invention also provides an illuminating apparatus for a vehicle comprising a light source and the optical waveguide hose of the first example, the optical waveguide hose at one plug being coupled to the light source for transmitting light therefrom toward the other plug. The illuminating apparatus includes light emergent means in the form of a light transmissive portion of at least one of the cladding and the other plug for allowing the light to emerge therefrom. An illuminating apparatus for a vehicle comprising a light source and the optical waveguide hose of the second example, the optical waveguide hose at one plug being coupled to the light source for transmitting light therefrom toward the other plug and including light emergent means in the form of a light transmissive portion of the cladding and sheath, the other plug, or both the cladding and sheath and the other plug for allowing the light to emerge therefrom.

The present invention further provides an indirect illuminating apparatus for providing indirect illumination to an interior and/or exterior of transportation means comprising a light source, the optical waveguide hose of the first or the second examples coupled at one plug to the light source for transmitting light therefrom, and elongated light emergent means disposed in the interior and/or exterior and associated with the hose for allowing the light to emerge outwardly from the hose in a continuous or discontinuous line pattern.

DETAILED DESCRIPTION OF THE INVENTION

Figure 1:
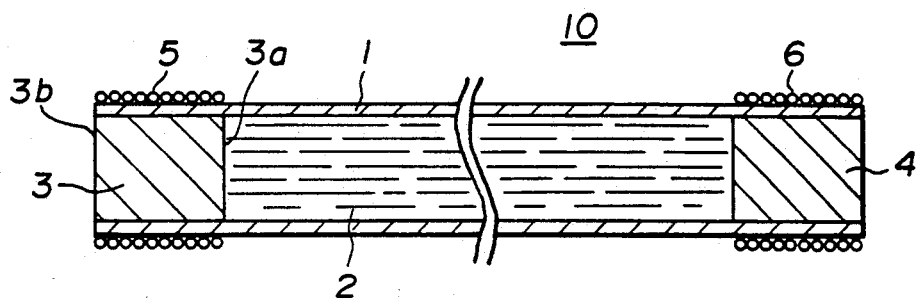
FIG. 1 is a schematic axial cross section of an optical waveguide hose according to one embodiment of the invention.

Referring to FIG. 1, there is illustrated a basic structure of an optical waveguide hose according to the present invention. The hose, generally designated at 10 is shown in FIG. 1 as comprises a hollow tubular cladding 1 having opposite end openings, a fluid core 2 filled in the cladding, and sealing plugs 3, 4 mated with the end openings of the cladding for closing the openings for maintaining the interior pressure of the cladding hollow interior. Clamps 5, 6 are fastened around the cladding ends for preventing release of the sealing plugs 3, 4 and leakage of the core fluid.

The material of which the hollow tubular cladding 1 is made is preferably a plastic or elastomeric material having flexibility and a low index of refraction and capable of being molded into a tubular form. Exemplary materials include polyethylene, polypropylene, polyamides, polystyrene, ABS, polymethyl methacrylate, polycarbonate, polyvinyl chloride, polyvinylidene chloride, polyvinyl acetate, polyethylene-vinyl acetate copolymers, polyvinyl alcohol, polyethylene-polyvinyl alcohol copolymers, fluoro resins, silicon resins, natural rubber, polyisoprene rubber, polybutadiene rubber, styrene-butadiene copolymers, butyl rubber, halogenated butyl rubber, chloroprene rubber, acryl rubber, EPDM, acrylonitrile-butadiene copolymers, fluoro rubber, and silicone rubber. Preferred among these are silicone polymers and fluoro polymers having a low index of refraction, for example, silicone polymers such as polydimethylsiloxane polymer, polymethylphenylsiloxane polymer, and fluorosilicone polymers; and fluoro polymers such as polytetrafluoroethylene (PTFE), ethylene tetrafluoride-propylene hexafluoride copolymers (FEP), ethylene tetrafluoride-perfluoroalkoxyethylene copolymers (PFE), polychlorotrifluoroethylene (PCTFE), ethylene tetrafluorideethylene copolymers (ETFE), polyvinylidene fluoride, polyvinyl fluoride, vinylidene fluoride-trifluorinated ethylene chloride copolymers, vinylidene fluoride-propylene hexafluoride copolymers, vinylidene fluoridepropylene hexafluoride-ethylene tetrafluoride terpolymers, ethylene tetrafluoride-propylene rubber, and fluorinated thermoplastic elastomers.

These cladding materials may be used alone or in admixture of two or more and formed as a single tube or multiple tubes. Only the interior surface of the cladding 5 in contact with the core fluid may be properly treated, for example, by coating or double extrusion to obtain a smoothed interior surface of the cladding and/or to prevent the swelling of the cladding due to the core fluid.

The core fluid 2 with which the hollow interior of the tubular cladding 1 is filled is a liquid or flowing transparent material (fluid) having a higher index of refraction than the cladding material. Exemplary fluids include aqueous solutions of inorganic salts, polyhydric alcohols such as ethylene glycol and glycerine, silicone oils such as polydimethylsiloxane and polyphenylmethylsiloxane, hydrocarbons such as polyethers, polyesters, and liquid paraffin, halogenated hydrocarbons such as trifluorinated ethylene chloride oil, phosphates such as tris(chloroethyl) phosphate and trioctyl phosphate, and solutions of polymers diluted with suitable solvents.

The core materials may be used alone or in admixture of two or more, whereby any desired optical scattering property can be obtained.

Figure 2:
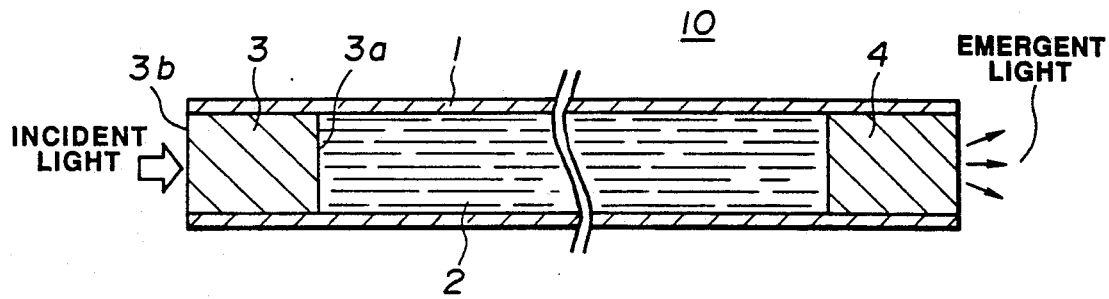
FIG. 2 is a schematic axial cross section of an optical waveguide hose according to another embodiment of the invention.
Figure 3:
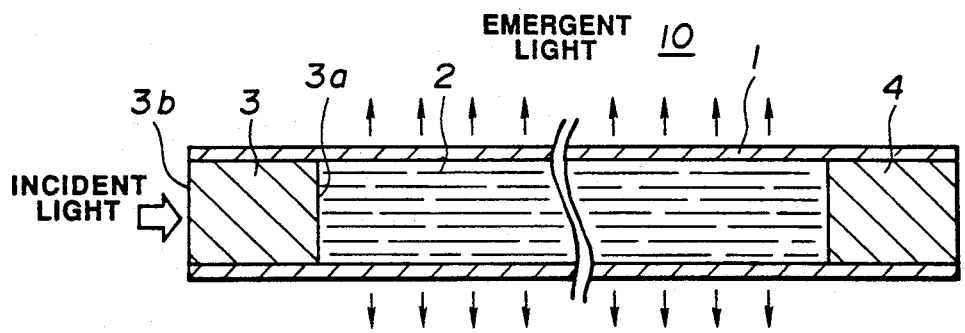
FIG. 3 is a schematic axial cross section of an optical waveguide hose according to a further embodiment of the invention.

The material of which the sealing plugs 3, 4 are made may be selected from inorganic glasses, organic glasses, metals, inorganic materials and plastics, depending on a particular purpose. In one exemplary embodiment wherein the plugs 3, 4 serve as an inlet window through which incident light enters the light waveguide hose and an outlet window through which the transmitted light emerges outside as shown in FIG. 2, both the plugs must be transparent. In another embodiment wherein light emerges outside from the hose in a radial direction through the cladding wall as shown in FIG. 3, the plug 4 need not be transparent.

The material of the plugs which must be transparent include inorganic glasses such as quartz glass, multicomponent glass, sapphire, and quartz; and organic glasses and transparent plastic materials such as polyethylene, polypropylene, ABS resins, acrylonitrile-styrene copolymer resins, styrene-butadiene copolymers, acrylonitrile-EPDM-styrene terpolymers, styrene-methyl methacrylate copolymers, methacrylic resins, epoxy resins, polymethyl pentene, allyl diglycol carbonate resins, spiran resins, amorphous polyolefins, polycarbonates, polyamides, polyarylates, polysulfones, polyallyl sulfones, polyether sulfones, polyether imides, polyimides, polyethylene terephthalate, diallyl phthalate, fluoro resins, polyester carbonates, and silicon resins. Preferred among these are inorganic glasses such as quartz glass, Pyrex glass and multi-component glass because they are transparent, heat resistant and chemically stable so that they are chemically inert to reaction with the core fluid in contact therewith at the inner end 3a of the plug 3 or with gases or moisture in contact therewith at the outer end 3b of the plug 3 (in FIG. 1) and thus maintain good performance over a long period of time.

Where transparency is not necessary, use may be made of metals such as stainless steels, e.g., Cr—Fe and Cr—Ni—Fe, aluminum, iron, titanium, copper and brass and ceramic materials as well as the above-mentioned materials. Plugs of opaque material is preferably polished or provided with a reflective film at the surface in contact with the core fluid in order to reflect light thereat to increase light emission from the lateral side.

The end clamps 5, 6 are preferably provided for preventing release of the plugs or leakage of the core fluid and for preventing gases from penetrating through the interface between the cladding and the plugs. The clamps may be hose bands, wires, sleeves, O-rings, gaskets or other suitable means which are fastened, wound, fitted or otherwise applied around the cladding ends and the plugs to accomplish a mechanical seal or another seal by thermal shrinkage, adhesion or curing. Preferably mouth pieces are fitted over the cladding ends and mechanically crimped to form a seal. The mouth pieces are made of iron, nickel, Fe—Cr—Ni alloy, aluminum, brass and titanium.

In the first example of the invention directed to an optical waveguide hose wherein a hollow tubular cladding is filled with a core fluid having a higher index of refraction than the cladding and sealing plugs are mated with opposite end openings of the cladding, the pressure of the core fluid is increased. The internal pressure of the core fluid may be properly selected in accordance with the material, inner and outer diameters of the cladding and the temperature range at which the hose is used. When the hose is used over the temperature range of 0° C. to 50° C., for example, the internal pressure is selected such that the internal pressure is at least 0 $kg/cm^2$ or an atmospheric pressure at 0° C. (or minimum service temperature) and below the withstand pressure of the cladding at 50° C. (or maximum service temperature). Preferably, the internal pressure is selected such that the internal pressure is 1 $kg/cm^2$ or more at the minimum service temperature and 80% or less of the withstand pressure of the cladding at the maximum service temperature, for example, 15 $kg/cm^2$ or less when a tetrafluoroethylene-hexafluoropropylene copolymer tube cladding having a thickness of 0.5 mm and an inner diameter of 12 mm is used. The pressure of the core fluid can be set higher than the pressure of the cladding, for example, by mating one plug with one end of the cladding, clamping the cladding end and the plug, and filling the cladding with the core fluid, and forcing another plug into the cladding from the opposite end thereof over a certain distance.

The internal pressure of the core fluid increases as the ambient temperature rises. If the cladding material is less pressure resistant, the cladding can be reinforced to increase its pressure resistance, for example, by covering it with metal or plastic material, winding a length of tape, or braiding fibers.

Figure 4:
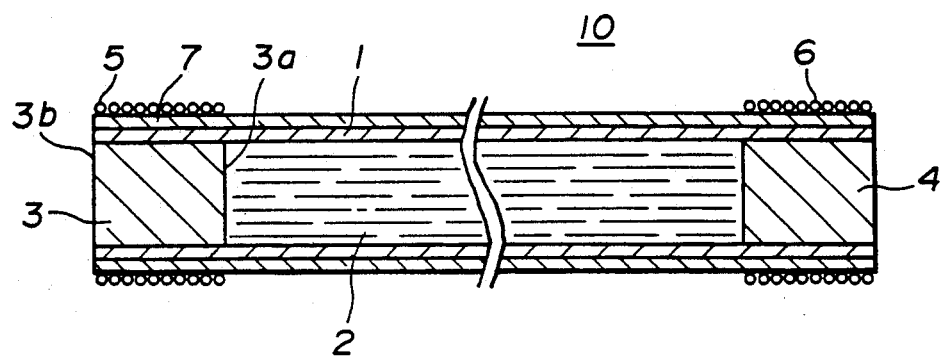
FIG. 4 is a schematic axial cross section of an optical waveguide hose according to a still further embodiment of the invention.

In the second example of the invention, an optical waveguide hose 10 is shown in FIG. 4 as comprising a hollow tubular cladding 1, a core fluid 2 filled therein having a higher index of refraction than the cladding and sealing plugs 3, 4 mated with opposite end openings of the cladding 1. The cladding 1 is covered over the outer periphery with a sheath 7 of a gas barrier material.

The gas barrier material of which the sheath 7 is made is preferably a material which has good gas barrier properties and does not impair the flexibility of the hose, for example, plastics, elastomers, metals and inorganic materials. Examples include polymers such as polyvinyl alcohol, ethylene-vinyl alcohol copolymers, polyvinylidene chloride, polyvinyl fluoride, polyesters, polychlorotrifluoroethylene, phenolic resins, polyamides, epoxy resins, polyacrylonitrile, polyvinyl chloride, cellulose, actual resins, polycarbonates, acrylic resins, polystyrene, fluoro resins, butyl rubber, halogenated butyl rubber, polyethylene, polypropylene, polyurethane, polyvinyl acetate, polyethylene-vinyl acetate copolymers, rubber hydrochloride, natural rubber, polyisoprene rubber, polybutadiene rubber, styrenebutadiene copolymers, chloroprene rubber, acryl rubber, EPDM, acrylonitrile-butadiene copolymers, and fluoro rubber; and metals such as stainless steel, aluminum, copper, iron, zinc, tin, brass, bronze, silver and gold. These materials may be used alone or as a composite material with other materials.

Because of gas barrier, transparency, environmental resistance, workability and availability, polyvinyl chloride, polyvinyl alcohol, ethylene-vinyl alcohol copolymers and polyvinylidene chloride are preferred. The sheath 7 is preferably 0.01 to 10 mm, especially 0.5 to 2 mm thick.

The cladding 1 is covered with a gas barrier material to form the sheath 7 over the outer periphery by any desired method, for example, by coating, extrusion molding, winding of a length of tape, and heat shrinkage. It is also possible to insert a light waveguide hose, a core/cladding configuration as shown in FIG. 1, into a flexible sleeve molded from a polymeric or metallic material. In this case, in order to prevent air and other gases present in the gap between the hose and the sleeve from penetrating into the hose, the gap is preferably filled with a sealant, for example, a liquid sealant such as silicone oil, fluorine oil, ethylene glycol, water, and liquid paraffin or a polymeric sealant such as silicone rubber and urethane rubber. Alternatively, a metallic material may be deposited on the outer surface of the cladding or the inner and/or outer surface of the sheath to form a metal film thereon by plating, evaporation or sputtering.

In the present invention, the optical waveguide hose may be one in which the fluid core is filled in the cladding under positive pressure according to the first example described above and at the same time the sheath of the gas barrier material encloses the outer periphery of the cladding according to the second example.

The optical waveguide hose mentioned above can find application as vehicle lighting systems and indirect lighting systems.

In one application, an optical waveguide hose as defined herein is connected to a light source at one end and to a light emitting means at the other end to construct a vehicle lighting system. The light emergent means may be established by providing transparency to all or part of the cladding and/or the plug.

In general, vehicles, typically automobiles are equipped with a number of lighting systems including head lamps, stop lamps, internal lamps, and indicator lamps in the dash board. The number of such lighting systems is increasing at present. For reducing the weight, volume occupying in the entire vehicle, and power consumption of lighting systems, and for preventing a temperature rise in the room by light sources, a lighting system using optical fibers was proposed. For example, a lighting system comprising a bundle of optical fibers for transmitting light from a light source to a desired site to be illuminated is known.

Conventional fiber optics used in such lighting systems include optical fibers of inorganic glass systems such as quartz glass and multi-component glass and optical fibers of plastic systems such as polymethyl methacrylate and polystyrene. These are all solid optical fibers wherein both the core and the cladding are solid materials.

In order for an optical fiber to efficiently transmit a large quantity of light from a light source, the fiber is desired to have a large diameter. Although the conventional optical fibers have satisfactory light transmission, they lose flexibility when their diameter is increased because they are formed from glass or hard plastics. Then for increasing the diameter for transmitting a large quantity of light, a plurality of optical fibers each having a diameter of about 10 to 1,000 $\mu$m must be bundled. The optical fiber bundle has a space left among fibers even when fibers are packed at a possible maximum packing density and thus has a reduced effective inlet surface area for receiving light. For example, a fiber bundle comprising optical fibers each having a core diameter of 80 $\mu$m and a fiber diameter of 100 $\mu$m has a fiber-to-fiber space of 23% and a total cladding area of 27% and thus the effective core area available for light passage is only 50%. The fiber bundle is thus very low in light incidence efficiency. In addition, the fiber bundle is very expensive because optical fibers themselves are expensive and joining them into a bundle requires some costs. This is the reason why the fiber bundle has not been employed in automotive lighting systems.

Under these circumstances, an advantageous automotive lighting system can be provided by using the optical waveguide hose of the invention and providing transparency to all or a part of the cladding and/or the plug. By eliminating a fiber bundle, the hose offers a simple structure, ease of diameter enlargement, low cost manufacture, flexibility, an increased effective light-receiving area, and efficient illumination. A large quantity of light from a light source can enter the optical waveguide hose at its incident end optically coupled to the light source and then be transmitted by the hose to a light emergent means optically coupled to the other end of the hose located at an illumination site inside or outside the vehicle where light is emitted from the light emergent means.

Figure 5:
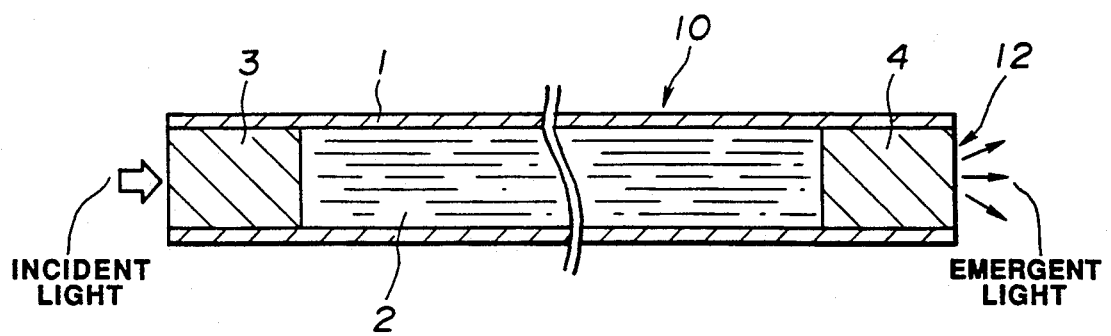
FIG. 5 is a schematic axial cross section of one exemplary vehicle lighting system using the optical waveguide hose of the invention.

Several examples of the vehicle lighting system are illustrated in the figures. Referring to FIG. 5, there is illustrated a first application wherein the optical waveguide hose 10 has an incident end (plug 3) adapted to receive incident light from a light source (not shown in FIG. 5, but similar to that shown in FIG. 6) and has an emergent end (plug 4) provided with a light emergent means 12 whereby light from the light source is transmitted to the light emergent means 12 by the hose 10 for light emission. The light emergent means 12 is constructed by forming the plug 4 at the emergent end from a transparent material whereby the outside end surface of the plug 4 becomes the light emergent means 12. It is to be noted that the hose shown in FIG. 5 may also be provided with clamps around the plugs as shown at 5, 6 in FIG. 1.

Figure 6:
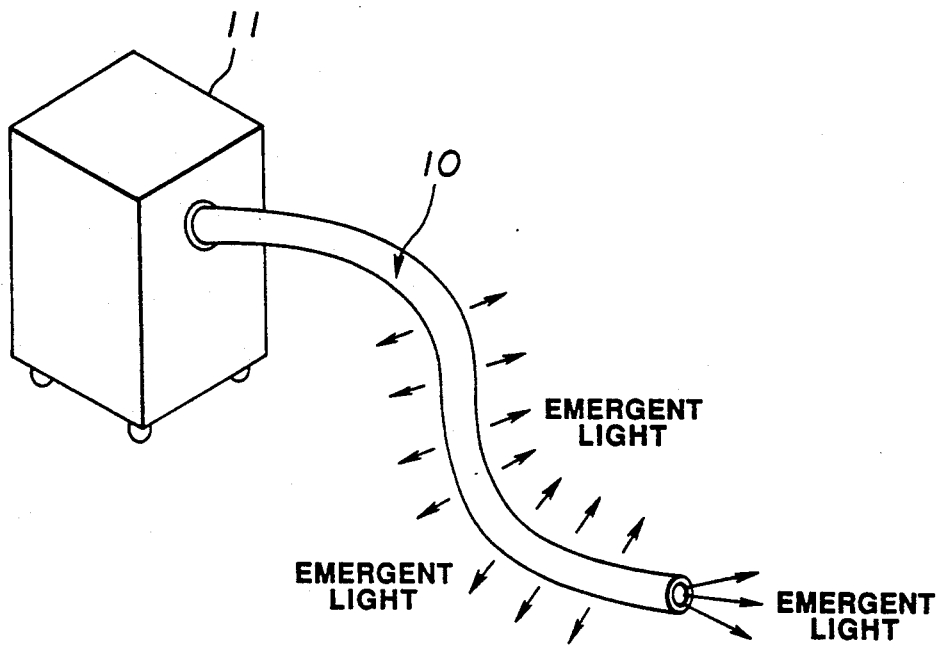
FIG. 6 is a perspective view of another exemplary vehicle lighting system using the optical waveguide hose of the invention.

FIG. 6 illustrates an application wherein an optical waveguide hose similar to that shown in FIG. 5 is optically coupled to a light source 11. The difference is that the optical waveguide hose 10 emits light from its distal end and side wall. Both the emergent plug 4 and the cladding 1 are formed of a transparent material.

The light source 11 includes discharge lamps such as incandescent lamps, fluorescent lamps, halogen lamps and metal halide lamps, artificial light sources such as light emitting diodes, semiconductor or gas lasers, electroluminescent elements and plasma light emitting tubes, and natural light as typified by sunlight. The light source may be a special one for the lighting system or light may be derived from the head lamp or sidemaker lamp. The light source may be disposed at any location within the automobile, for example, in the engine room, dash board, console box, trunk room, under the front seat, or near the front or rear fenders.

Figure 7:
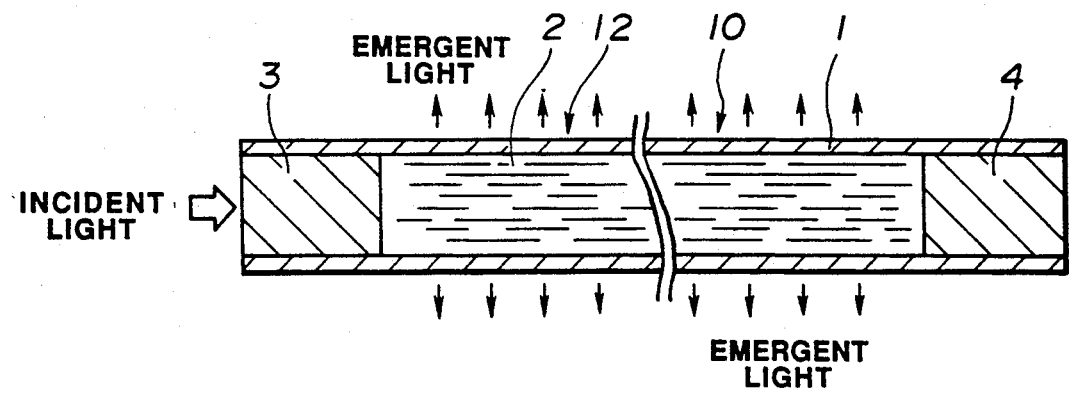
FIG. 7 is a schematic axial cross section of a third exemplary vehicle lighting system using the optical waveguide hose of the invention.

FIG. 7 illustrates another application of the optical waveguide hose 10 which is similar to that of FIG. 5, but different in that it emits light from the side wall, but not from the distal end. The distal plug 4 is formed of an opaque material and the cladding 1 is formed of a transparent material.

If desired, the optical waveguide hose 10 as shown in FIG. 7 may be provided with a coating 13 for protection purposes as shown in FIGS. 8 to 12. The coating 13 may be formed of plastics, elastomers, metals, glasses, or inorganic materials. Examples include polyvinyl alcohol, ethylene-vinyl alcohol copolymers, polyvinylidene chloride, polyvinyl fluoride, polyesters, polychlorotrifluoroethylene, phenolic resins, polyamides, epoxy resins, plyacrylonitrile, polyvinyl chloride, cellulose, acetal resins, polycarbonates, acrylic resins, polystyrene, fluoro resins, butyl rubber halogenated butyl rubber polyethylene, polypropylene, polyurethane, polyvinyl acetate, polyethylenevinyl acetate copolymers, rubber hydrochloride, natural rubber, polyisoprene, polybutadiene rubber, styrene-butadiene copolymers, chloroprene rubber, acryl rubber, EPDM, acrylonitrilebutadiene copolymers, and fluoro rubber, which may be applied to the cladding by coating, extrusion molding, tape winding, or heat shrinkage. Alternatively, metal materials such as SUS stainless steel, aluminum, copper, iron, zinc, tin, brass, bronze, silver and gold or polymeric materials as mentioned above may be formed into a pipe, bellows tube or spiral wire into which the optical waveguide hose can be inserted. Also, the metal material may be deposited on the outer surface of the tubular cladding 1 to form a metal coating by plating, evaporation or sputtering. The coating materials may be used alone or as a composite material with other materials. When the coating material is a gas barrier material as previously described for the second form of the invention, the resulting optical waveguide hose is that of the second example.

Figure 8:
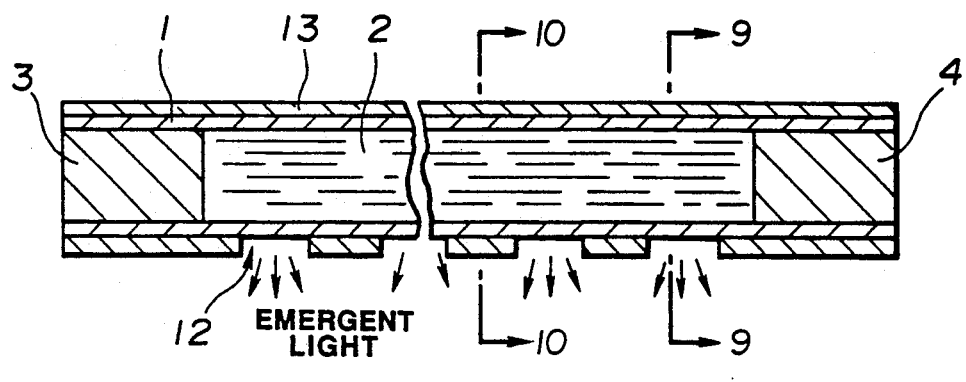
FIG. 8 is a schematic axial cross section of a fourth exemplary vehicle lighting system using the optical waveguide hose of the invention having a coating around the cladding.
Figure 9:
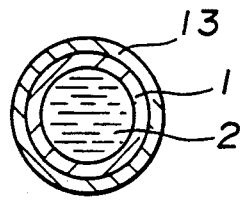
FIG. 9 is a cross section taken along lines A-A' in FIG. 8.
Figure 10:
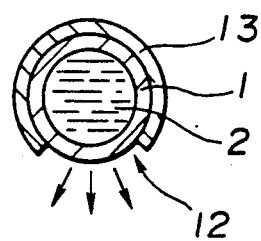
FIG. 10 is a cross section taken along lines B-B' in FIG. 8.
Figure 11:
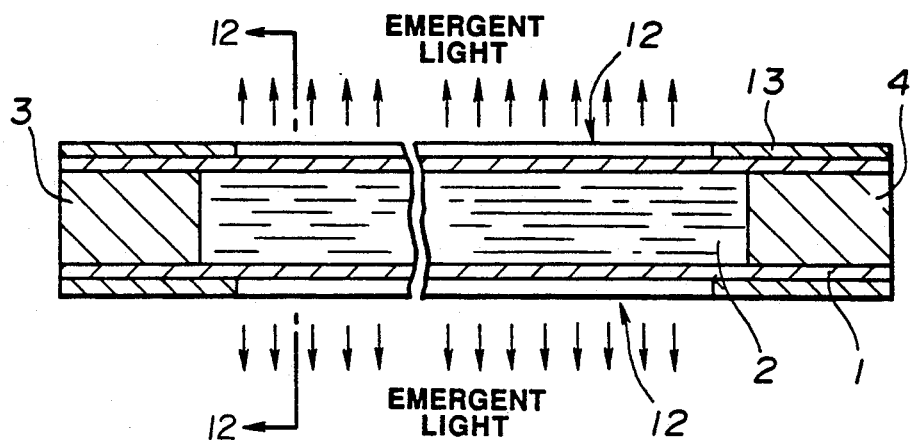
FIG. 11 is a schematic axial cross section of a fifth exemplary vehicle lighting system using the optical waveguide hose of the invention having a coating around the cladding.
Figure 12:
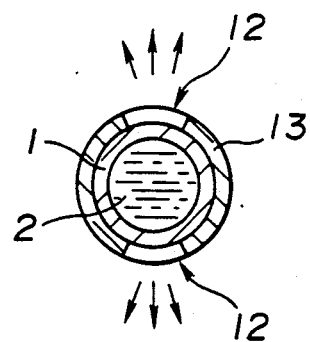
FIG. 12 is a cross section taken along lines C-C' in FIG. 11.

The coating 13 may be provided not only for the protection of the optical waveguide hose 10, but also for light shielding or for allowance of light emission at a preselected site. For the last mentioned purpose, the coating 13 is provided with a series of openings at preselected sites as shown in FIGS. 8 to 10 or a pair of slits as shown in FIGS. 11 and 12. The openings or slits are depicted at 12 since they are light emergent means. Alternatively, the coating 13 can be locally transparent. Light emerges from the hose to the outside through the openings or slits 12 so that the hose becomes a spot or line light emitting member. The coating 13 may be made more reflective on the inner surface by applying an aluminum deposit thereto by evaporation or plating or adhesively attaching a reflector thereto.

Figure 13:
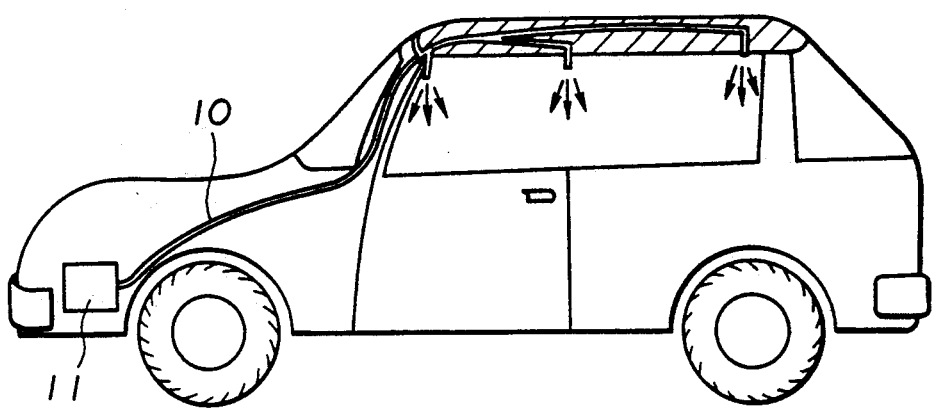
FIG. 13 is a schematic view of a further application of the lighting system to automotive interior lighting.

FIG. 13 illustrates one application of the above-mentioned lighting system to the automobile ceiling for room illumination. A light source 11 is coupled to an incident end of an optical waveguide hose 10 which extends to and along the automobile ceiling and has a plurality of light emergent means located at preselected positions. The light source 11 may be a special light source disposed in the automobile or the existing light source such as the head lamp. Light from the light source 11 is transmitted by the hose 10 and exits from the hose at the preselected ceiling positions to serves as a map lamp, internal lamp, reading lamp or the like.

Figure 14:
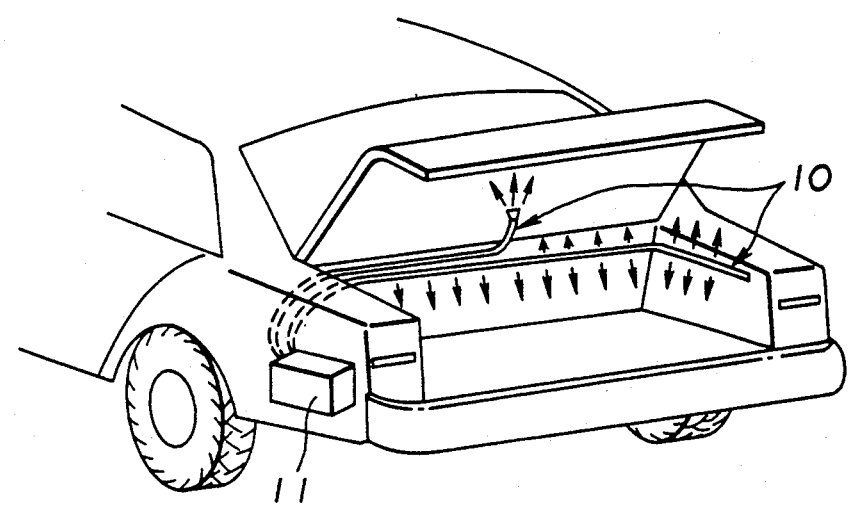
FIG. 14 is a schematic view of a further application of the lighting system to automotive trunk room lighting.

FIG. 14 illustrates another application of the lighting system to the automobile trunk room for illumination. A light source 11 is coupled to an incident end of an optical waveguide hose 10 which extends along the trunk room and has a slit form light emergent means. Also coupled to the light source 10 is another optical waveguide hose 10 which has a light emergent means at the distal end. The light source 11 may be a special light source or the existing light source such as the tail lamp.

Figure 15:
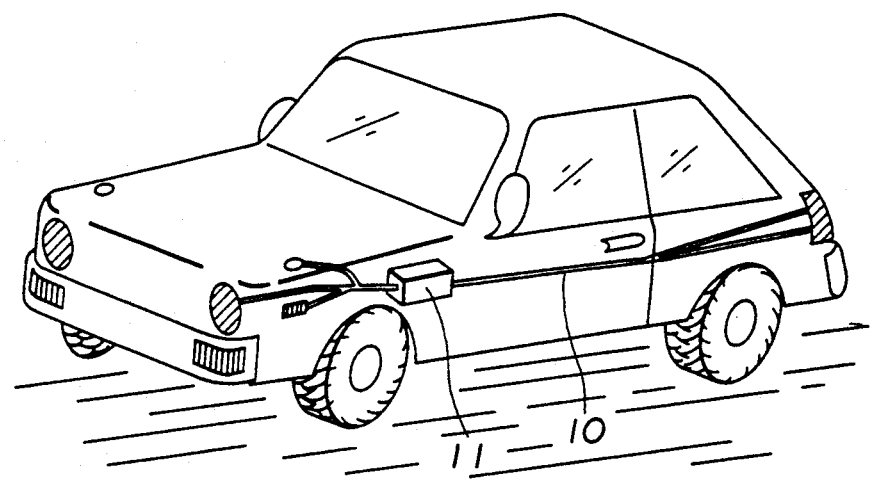
FIG. 15 is a schematic view of a further application of the lighting system to automotive exterior lighting.

FIG. 15 illustrates a further application of the lighting system for automobile exterior illumination for operating head lamps, signal lamps, sidemarker lamps, tail lamps, brake lamps and reverse lamps.

The applications of FIGS. 13 to 15 are exemplary and the lighting system is also applicable as interior lights for the illumination of meters, switches, glove compartment, ash tray, key hole or the like. On the exterior, the lighting system may be applied as illuminating and light emitting members for license plate illumination, license plate back light, emblem illumination, antenna pole tip lighting, and linear lighting of a corner pole, bumper and moulding.

Also contemplated herein is an indirect illuminating apparatus for providing indirect illumination in the interior and/or exterior of transportation means such as automobile, ship and aircraft, comprising a light source, an optical waveguide hose coupled to the light source for transmitting light therefrom, and elongated light emergent means for allowing the light to emerge or scatter outwardly from the hose in a continuous or discontinuous line pattern.

In general, automobiles are equipped with a compartment illuminating system including a compartment lamp for providing a suitable degree of illumination to the inside of the automobile when desired. Often the illuminating system uses a luminaire for providing a spot of light, that is, a single lamp for providing direct illumination to a single compartment. There are few lamps which provide illuminating light over the entire compartment evenly to corners. In addition, a map lamp, flexible light, foot lamp or the like is attached as the case may be or if the driver desires. A number of light sources corresponding to the number of such optional lamps are necessary and consume an electric power. These optional lamps are normally turned off in order to prevent dazzlement to the driver or exhaustion of the battery. The compartment is normally dark except for lighted panel meters, which is inconvenient in some situations.

The vehicle body on the outside is equipped with lamps such as head lamps, signal lamps, tail lamps and brake lamps for insure safety driving. Usually few marker lights are available on the side walls of the vehicle body, leaving a safety problem especially in the case of trailers having a long carrier.

By providing an optical waveguide hose of the invention with an elongated light emergent means, disposed inside or outside the vehicle, for allowing the transmitted light to emerge or scatter outwardly from the hose in a continuous or discontinuous line pattern, there is obtained an indirect illuminating system which can illuminate compartment corners or any desired site on the exterior and which uses a single light source and thus consumes a minimum quantity of electric power.

Figure 16:
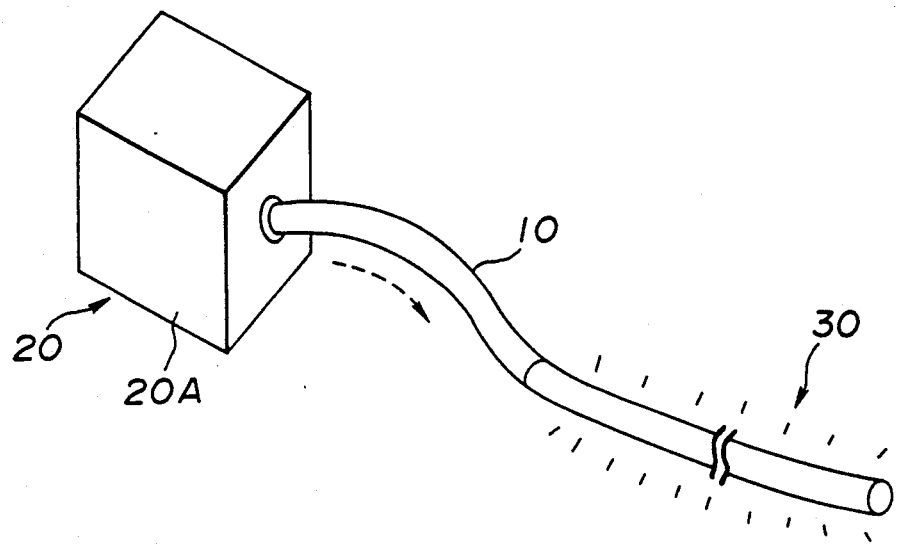
FIG. 16 is a schematic view of a further application of the lighting system to indirect lighting.
Figure 17:
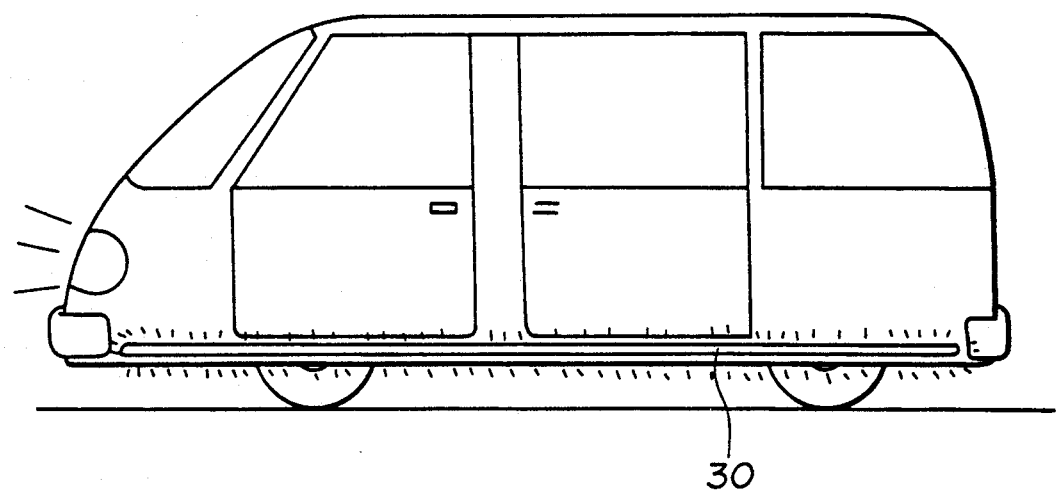
FIG. 17 is a schematic view of a further application of the lighting system to automotive exterior lighting.

FIG. 16 schematically illustrates an indirect illuminating system comprising an optical waveguide hose 10 coupled to a light source 20 and having an elongated light emergent means or illuminating means 30. FIG. 17 illustrates one application of this indirect illuminating system to an automobile body side panel for providing illumination in a line pattern along the lower edge of the side panel.

The light source 20 which is received in a lamp housing 20A includes artificial light sources such as incandescent lamps, fluorescent lamps, halogen lamps, metal halide lamps, light emitting diodes, semiconductor or gas lasers, electroluminescent elements, and plasma light emitting tubes and natural light as typified by sunlight. The light source may be a special one for the illuminating system or light may be derived from the head lamp or sidemarker lamp. The light source may be disposed at any location within the automobile, for example, in the engine room, dash board, console box, trunk room, under the front seat, or near the front or rear fenders.

Figure 18:
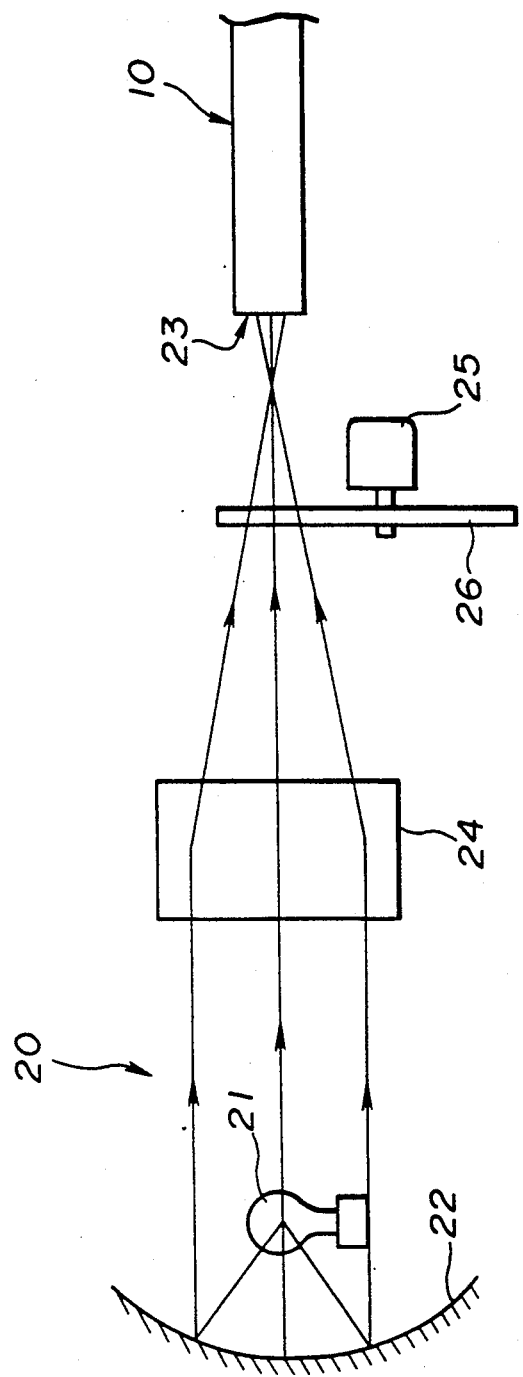
FIG. 18 is a schematic view showing the inventive hose receiving light from a light source.

The coupling between the light source 20 and the optical waveguide hose 10 is shown in FIG. 18. The light source 20 includes a lamp 21 located at the focus of a concave mirror 22 for reflecting light from the lamp into parallel light rays. A condenser lens 24 is located in proximity to the lamp 21 for gathering the parallel light rays toward a window 23 which is an incident end of the hose 10. On the optical path along which the condensed light passes is positioned a color filter 26 which is mounted on a shaft of a motor 25 for changing the color of indirect illuminating light appearing at the illuminating means 30 or along the vehicle side in accordance with a driving state, for example, coloring red the transmitting light upon emergency braking. Although the lamp 21 is continuously operated in this embodiment, it may be operated in a pulse or flash manner.

Figure 19:
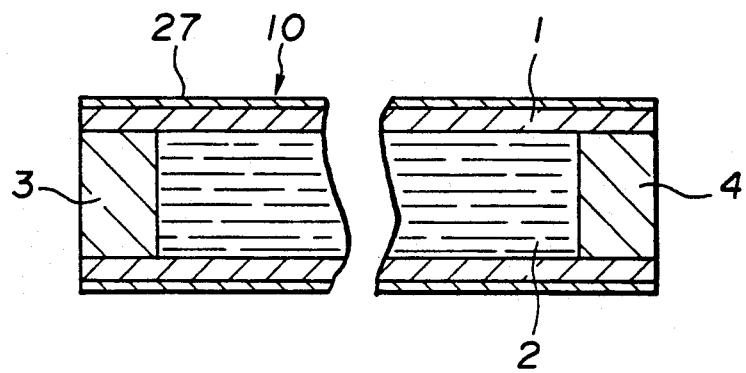
FIG. 19 is a schematic axial cross section of an optical waveguide hose according to a yet further embodiment of the invention.

The optical waveguide hose 10 used herein is shown in FIG. 19 as comprising a cladding 1 filled with a fluid core 2 and closed at opposite ends with transparent plugs 3, 4. The cladding 1 has a lower index of refraction than the core 2 whereby total reflection of light occurs at the interface therebetween so that light incident at one end is transmitted to the other end by virtue of repetitive total reflection. An opaque coating 27 encloses the outer surface of the cladding 1 for the purpose of light shielding. The internal pressure of the core fluid is increased in the first example or the coating 27 is formed of a gas barrier material in the second example of the invention.

In the system of FIG. 16, light of a selected color is transmitted by the optical waveguide hose 10 from the light source 20 to the illuminating means 30 which is adapted to allow the light to uniformly emerge therefrom in a line pattern. In this embodiment, the illuminating means 30 is a light scattering tube connected to the emergent end of the hose 10 although it may be a diffusion plate in the form of a ground glass plate.

Figure 20:
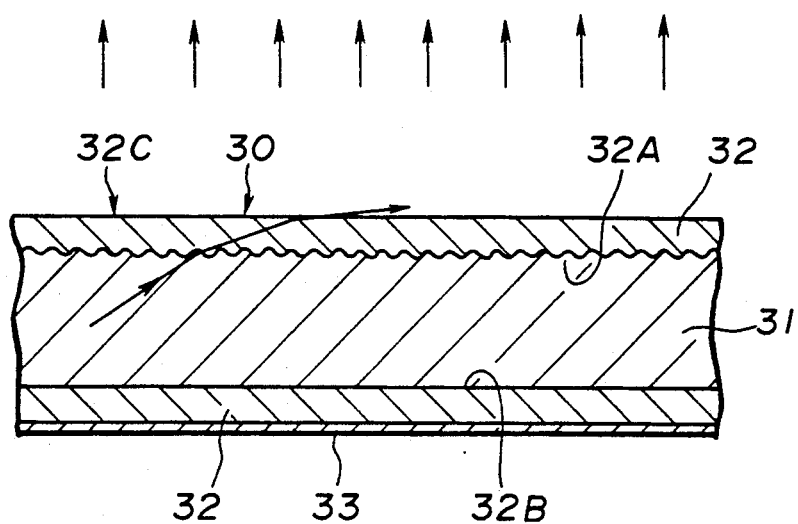
FIG. 20 is a cross section of illuminating means according to the present invention.

The light scattering tube 30 in this embodiment is shown in FIG. 20 as comprising a core 31 of the same transparent material as the core of the optical waveguide hose 10 and a cladding 32 surrounding the core 31. Among the inner surface of the cladding 32 in contact with the core 31, one half 32A is provided with irregularities and the remaining half 32B is smooth. Except for the interfacial irregularities, the light scattering tube may be the same as the optical waveguide hose 10 shown in FIG. 19 with the light shielding coating removed. The light scattering tube 30 receives light incoming from the hose 10 and allows light to propagate through the core 31 while light undergoes total reflection at the smooth interface 32B, but not at the irregular interface 32A so that part of light penetrates into the cladding 32 and exits outwardly from the cladding outer surface 32C as shown by arrows. It is to be noted that one half of the outer surface of the cladding 32 corresponding to the smooth interface 32B is covered with an opaque coating 33 for light shielding. A light scattering material may also be used which is obtained by dispersing in a transparent matrix another transparent material having a different index of refraction from the matrix to form an optically heterogeneous structure. This light scattering material can be molded into a rod shape serving as a light scattering tube or a plate or any other desired shape for light emission.

Figure 21:
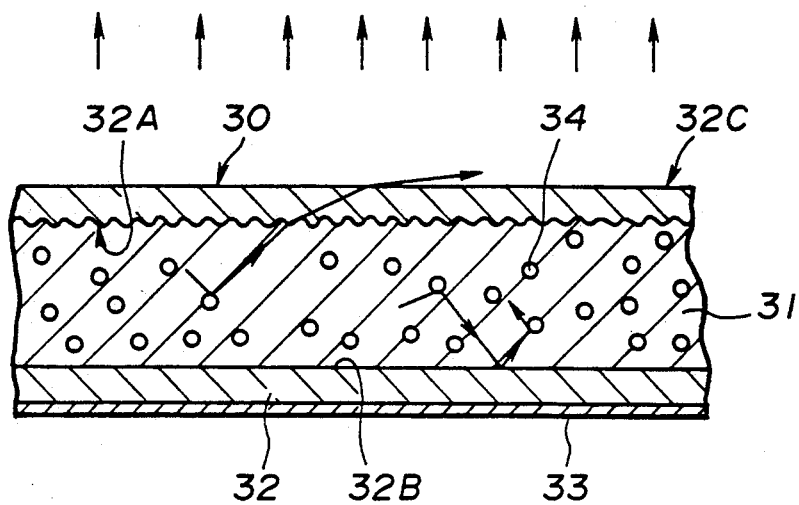
FIG. 21 is a cross section of a modified example of the illuminating means according to the present invention.

Another example of the light scattering tube 30 is shown in FIG. 21 as comprising a core 31 of a viscous transparent material having dispersed therein spherical reflecting/scattering beads 34 coated with a high reflectivity film. The tube 30 of FIG. 21 is the same as FIG. 20 except for the composite core 31, which allows for light emissions of higher efficiency and higher brightness.

Figure 22:
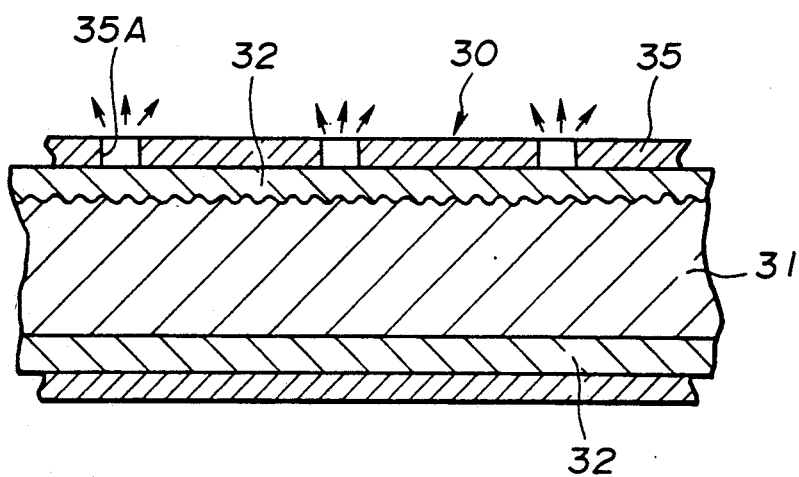
FIG. 22 is a cross section of another modified example of the illuminating means according to the present invention.

A further example of the light scattering tube 30 is shown in FIG. 22 as comprising an opaque coating 35 totally enclosing the cladding 32, the coating 35 being provided with a plurality of apertures 35A for allowing light to exit from the tube outwardly. This provides indirect illumination in a series of spot light emissions.

Although the indirect illuminating system is applied to the side panel lower edge of the automobile body in the illustrated embodiment, it is not limited thereto and may be applied to ship vessel exteriors subject to water splashing, aircraft fuselage exteriors as well as room floor, ceiling and other portions of automobiles, ships and aircraft for providing a line pattern of indirect illumination.

The indirect illumination system mentioned above requires only one light source to provide a line pattern of illuminating light emerging or scattering from an elongate illuminating means. That is, a number of areas or a wider area can be illuminated with a single light source. The system accomplishes indirect illumination at high efficiency with a minimum power consumption.

The system is advantageous for vehicles since it is lightweight, small in volume, easy to maintain, resistant against vibration, and failure proof. The system can provide illumination to areas which are otherwise difficult to illuminate with conventional systems, for example, tight rooms and areas subject to direct influence of weather and sea water. The system offers a versatile indirect illumination system which can be installed at any desired place to provide illumination to desired areas.

The optical waveguide hose of the present invention can find advantageous use in the following applications.
(1) Multi-spot light emission apparatus The optical waveguide hose is locally depressed for light leakage. Light emission is available at a plurality of positions along a single optical waveguide hose. This is applicable to automotive instrument panels, audio unit manipulating panels, electric illuminations and the like.
(2) Luminaire at high altitude and dangerous location The hose can be used for illumination or light-up of high altitude and dangerous locations such as buildings and towers. Since the light source and the light emergent portion can be separated, maintenance including lamp replacement is easy. The hose can be applied to street and highway lighting where lamp replacement is difficult.

(3) Water-proof luminaire

Water-proof luminaires are used under or near water for illumination at, for example, fountains, pools, aquariums, baths, water tanks, sea, rivers, lakes and ponds. Since the light source and the light emergent portion can be separated, there is no risk of electric leakage or no need for a special protector.

(4) Cold light luminaire

Cold light luminaires which generate least heat are used for the illumination of articles susceptible to thermal damage such as flowers, foods and other objects at florists, food shops, refrigerators, studios, and stages.

(5) Underwater fungicidal apparatus

Light of a wavelength having fungicidal activity such as ultraviolet light is transmitted by the hose for providing fungicidal action to water in pools, ponds and water tanks.

(6) Explosion-proof luminaire

Explosion-proof luminaires are used for illumination in dangerous zones like explosive warehouses, gas tanks, tanker holds, tunnels, and mine tunnels.

(7) Light fence apparatus

Light fence apparatus use optical waveguide hoses to provide continuous or intermittent illumination in a line pattern for guiding persons and vehicles (e.g., automobiles, ships and aircraft) in a safe way while preventing them entering dangerous zones. When persons or vehicles collide with the apparatus, the apparatus are flexible enough to bend or expand to damp collision forces. Included are guard rails, construction markers, and ski slope safe markers.

(8) Spot lighting apparatus

A point light source is used at a hard-to-access location.

(9) Light markers

Light markers use optical waveguide hoses to provide continuous or intermittent illumination in a line pattern for displaying a right course or destination for guiding purposes. Included are guide panels at stations and hospitals, panels at marine structures such as marine hoses and pontoons, emergency guide lines in buildings, foot lights in theaters, guide markers in escalators, stairways and crossing zones, course lines in tracks and pools, and guide ways in airfields.

(10) Signal lights

A single eye signal light has a light source with a color switching means and an optical waveguide hose for transmitting light from the light source to its emergent end.

(11) Breeding luminaires

Breeding luminaires are to irradiate light to organisms like plants and microorganisms, the light having a wavelength band suitable or necessary for the growth of organisms. They are used in incubating tanks and green houses.

(12) Underwater luminaires

Underwater luminaires which emit light having a wavelength band repellent to fish are attached to underwater cages and suits for repelling sharks.

(13) Sound light systems

Sound light systems are designed to change the brightness of light or the interval of lighting in accordance with a change of ambient sound from a sound source such as changes in sonic intensity and scale of music, shout, and hand clapping. They are used in entertainment places including concert halls, discotheques, amusement parks and games.

(14) Fish luring luminaires

Fish luring luminaires which emit light attractive to fish are attached to traps or used as fish-luring lights.

(15) Planar lighting apparatus

Planar or curved areas in advertising towers, signboards, ceilings and walls are lighted as a two dimensional display.

EXAMPLE

Examples of the present invention are given below by way of illustration and not by way of limitation.

EXAMPLE 1

A hollow tubular cladding of ethylene tetrafluoride-propylene hexafluoride copolymer having an inner diameter of 12 mm, an outer diameter of 13 mm and a length of 3 m was equipped with a pressure gage at one open end and charged with trioctyl phosphate from the other open end. A quartz rod having a diameter of 13 mm and a length of 50 mm was inserted into the cladding from the other end until an internal pressure of 4 $kg/cm^2$ was reached at room temperature. At this point the other end was tightly clamped by winding a metal wire thereon. This optical waveguide hose for internal pressure measurement maintained an internal pressure of 0.5 $kg/cm^2$ at $-10°$ C.

An optical waveguide hose was manufactured by the same procedure as above except that the pressure gage was replaced by a quartz rod. The hose was allowed to stand in a refrigerator at $-10°$ C. for 6 months. At the end of 6-month cold storage, the hose maintained high light transmittance without air penetration.

When the hose was bent to a radius of 200 mm, no kink was formed, indicating that the hose had flexibility and ease of handling.

Comparative Example 1

An optical waveguide hose for internal pressure measurement was manufactured by the same procedure as in Example 1 except that the internal pressure was 0 $kg/cm^2$ at room temperature. This hose showed an internal pressure of 50 mmHg at 10° C.

An optical waveguide hose was manufactured by the same procedure as above except that the pressure gage was replaced by a quartz rod. The hose was allowed to stand in a refrigerator at 10° C. After one week, about 2 ml of air developed in the core and the light transmittance dropped from 70% at the initial to 40% after air penetration. When the hose was bent, a kink was formed at a radius of 400 mm.

EXAMPLE 2

A hollow tubular cladding of ethylene tetrafluoride-propylene hexafluoride copolymer having an inner diameter of 12 mm, an outer diameter of 13 mm and a length of 3 m was covered with a polyvinyl chloride resin to a thickness of 1 mm to form a double wall tube (cladding+sheath) and charged with trioctyl phosphate. Quartz rods having a diameter of 13 mm and a length of 50 mm were inserted into the cladding from opposite ends. The tube ends were tightly clamped to the rods by winding a metal wire thereon.

The hose was allowed to stand in a refrigerator at $-5°$ C. for 6 months. At the end of 6-month cold storage, the hose maintained high light transmittance without air penetration.

EXAMPLE 3

An optical waveguide hose was manufactured by the same procedure as Example 2 except that the polyvinyl chloride resin as the sheath material was replaced by a polyethylenevinyl acetate copolymer having a vinyl acetate content of 25% by weight.

The hose was allowed to stand in a refrigerator at −5° C. for 6 months. At the end of 6-month cold storage, the hose maintained high light transmittance without air penetration.

Comparative Example 2

An optical waveguide hose was manufactured by the same procedure as Example 2 except that the sheath was omitted.

The hose was allowed to stand in a refrigerator at −5° C. After two days, about 1 ml of air developed in the core and the light transmittance dropped from 70% at the initial to 40% after air penetration.

Although some preferred embodiments have been described, many modifications and variations may be made thereto in the light of the above teachings. It is therefore to be understood that within the scope of the appended claims, the invention may be practiced otherwise than as specifically described.

We claim:

1. An optical waveguide hose comprising;
  a hollow tubular cladding having opposite end openings,
  a core of a fluid having a higher index of refraction than the cladding, the fluid core being filled in the cladding such that the internal pressure is at least 0 kg/cm$^2$ at the minimum service temperature and below the withstand pressure of the cladding at the maximum service temperature, and
  sealing plugs mated with the end openings of the cladding.

2. The hose of claim 1 wherein the pressure of the core fluid is set higher than the pressure of the cladding by mating one plug with one end of the cladding, clamping the cladding end and the plug, and filling the cladding with the core fluid, and forcing another plug into the cladding from the opposite end thereof over a certain distance.

3. An illuminating apparatus for a vehicle comprising a light source and
  the optical waveguide hose of claim 1, said optical waveguide hose at one plug being coupled to the light source for transmitting light therefrom toward the other plug and including light emergent means in the form of a light transmissive portion of at least one of the cladding and the other plug for allowing the light to emerge therefrom.

4. An optical waveguide hose comprising;
  a hollow tubular cladding having opposite end openings,
  a core of a fluid having a higher index of refraction than the cladding, the fluid core being filled in the cladding,
  sealing plugs mated with the end openings of the cladding, and
  a sheath of a gas barrier material enclosing the outer periphery of said cladding, said sheath of the gas barrier material is at least one selected from the group consisting of polyvinyl chloride, polyvinyl alcohol, ethylene-vinyl alcohol copolymers and polyvinylidene chloride.

5. The hose of claim 4 wherein said sheath is 0.01 to 10 mm thick.

6. An optical waveguide hose comprising:
  a hollow tubular cladding having opposite end openings,
  a core of a fluid having a higher index of refraction than the cladding, the fluid core being filled in the cladding such that the internal pressure is at least 0 kg/cm$^2$ at the minimum service temperature and below the withstand pressure of the cladding at the maximum service temperature,
  sealing plugs mated with the end openings of the cladding, and
  a sheath of a gas barrier material enclosing the outer periphery of said cladding.

7. An optical waveguide hose comprising:
  a hollow tubular cladding having opposite end openings,
  a core of a fluid having a higher index of refraction than the cladding, the fluid core being filled in the cladding under pressure,
  sealing plugs mated with the end openings of the cladding, and
  a sheath of a gas barrier material enclosing the outer periphery of said cladding, said sheath of the gas barrier material is at least one selected from the group consisting of polyvinyl chloride, polyvinyl alcohol, ethylene-vinyl alcohol copolymers and polyvinylidene chloride.

8. The optical waveguide hose of claims 4, 6 or 7, further comprising a light source and wherein said optical waveguide hose at one plug being coupled to the light source for transmitting light therefrom toward the other plug and including light emergent means in the form of a light transmissive portion of the cladding and sheath, the other plug, or both the cladding and sheath and the other plug for allowing the light to emerge therefrom, to provide an illuminating apparatus for a vehicle.

9. The optical waveguide hose of claims 4, 6 or 7 further comprising a light source, wherein said optical waveguide hose is coupled at one plug to the light source for transmitting light therefrom, and
  elongated light emergent means associated with said hose for allowing the light to emerge outwardly from the hose in a line pattern to provide indirect illumination.

10. The optical waveguide of claim 9, wherein said sheath is constructed such that light emerging outwardly from said hose is continuous.

11. The optical waveguide of claim 9, wherein said sheath is constructed such that light emerging outwardly from said hose is discontinuous.

12. The optical waveguide hose of claim 7, wherein the fluid core is filled in the cladding such that the internal pressure is at least 0 kg/cm$^2$ at the minimum service temperature and below the withstand pressure of the cladding at the maximum service temperature.

* * * * *